United States Patent [19]

Parro

[11] 4,295,342
[45] Oct. 20, 1981

[54] HEAT EXCHANGE METHOD USING NATURAL FLOW OF HEAT EXCHANGE MEDIUM

[76] Inventor: James Parro, R.D. 2, Sadler Rd., Skaneateles, N.Y. 13152

[21] Appl. No.: 56,419

[22] Filed: Jul. 10, 1979

Related U.S. Application Data

[63] Continuation-in-part of Ser. No. 845,896, Oct. 27, 1977, abandoned.

[51] Int. Cl.³ .................. F25D 15/00; F28D 15/00
[52] U.S. Cl. .................................. 62/119; 62/333; 165/DIG. 12; 165/104.21
[58] Field of Search .............. 165/105, DIG. 12; 62/333, 119

[56] References Cited

U.S. PATENT DOCUMENTS

| | | | |
|---|---|---|---|
| 2,072,486 | 3/1937 | Smith | 62/333 X |
| 3,623,549 | 11/1971 | Smith, Jr. | 165/107 |
| 3,865,184 | 2/1975 | Grover | 165/105 |

FOREIGN PATENT DOCUMENTS 1028617  2/1953  France ................. 165/105

22272 of 1892  United Kingdom ............... 165/105

*Primary Examiner*—Albert W. Davis
*Attorney, Agent, or Firm*—Charles S. McGuire

[57] ABSTRACT

Heat exchange is effected in a simple and economical manner by allowing natural flow, i.e., without mechanical compressors, pumps, etc., of a heat exchange fluid such as a conventional refrigerant liquid between two heat exchangers which are exposed to air at different temperatures. The two heat exchangers, which may conveniently take the form of fin-tube heat exchangers, for example, are arranged with one end at a higher elevation than the other, the upper ends of the two exchangers being connected in direct communication and the lower ends being likewise connected. As the refrigerant liquid absorbs heat and evaporates in the heat exchanger exposed to the warmer air the vapor travels through the upper connecting line to the other heat exchanger, where it rejects heat and is condensed, the liquid flows through the lower connecting line back to the first heat exchanger, and so on, with heat exchange between the two air streams or masses occurring during the natural, continuous flow of the refrigerant in gaseous and liquid form.

9 Claims, 7 Drawing Figures

HEAT EXCHANGE METHOD USING NATURAL FLOW OF HEAT EXCHANGE MEDIUM

CROSS-REFERENCE TO RELATED APPLICATION

This application is a continuation-in-part of Ser. No. 845,896 filed Oct. 27, 1977, now abandoned.

BACKGROUND OF THE INVENTION

The present invention relates to heat transfer apparatus and methods for heating and cooling purposes.

In many situations proper ventilation requires that air be exhausted from a room or other enclosed space to the outside atmosphere or to another space which is either hotter or colder than the enclosed space, which is maintained at or near a desired temperature by a heating or cooling system. The air exhausted is replaced by air from the outside which must, therefore be heated or cooled, with consequent consumption of energy, in order to bring it to the desired temperature.

Energy sources such as fossil fuels which are commonly used to provide the needed energy for comfort heating and cooling are ever increasing in cost and decreasing in supply. Thus, it has become necessary to seek not only new sources of energy, but also means for conserving and utilizing more efficiently the energy now in use. So-called counter-flow heat exchangers are designed to transfer some of the heat to or from the air supplied to an enclosed space by heat exchange with the air exhausted therefrom. One of the more recent innovations in this line is the rotary, metal mesh, heat exchange wheel such as disclosed, for example, in U.S. Pat. No. 4,014,380. Other means such as water-source heat pumps and heat pipe fin-tube assemblies are also used as energy-conserving heat transfer means.

Although many recent innovations in the heat transfer field represent significant advances in providing the desired comfort heating and cooling with lower energy consumption, there remains a constant need and search for improvement. Some of the design requirements of existing systems which increase the costs of production, installation and/or maintenance thereof are: the rotary metal-mesh wheels dictate the shape of mechanical equipment and require the air flow ducts to be immediately adjacent; the heat pipe has many individual circuits which must be individually charged and leak tested and, in order to operate at full capacity, must be installed in a tilted position.

It is an object of the present invention to provide a novel and improved heat exchange system wherein heat is automatically transferred in either direction between air exhausted from and air supplied to an enclosed space to bring the air supplied closer to the temperature of that exhausted.

A further object is to provide a heat transfer method and apparatus utilizing fin tube coils over which incoming and outgoing air streams are directed and which requires no moving parts in order to transfer heat from the warmer to the colder of the two air streams. Another object is to provide a novel thermal building panel wherein heat collected on the exterior is given up within the building.

A still further object is to provide novel apparatus for cooling an enclosed space by natural flow of a refrigerant without transferring air from outside to inside of the space and without utilizing mechanical refrigeration.

Other objects will in part be obvious and will in part appear hereinafter.

SUMMARY OF THE INVENTION

In accordance with the foregoing objects the invention contemplates a pair of fin-tube heat exchangers connected in sealed relation at both their upper and lower ends, forming a closed system for free flow of gas and liquid in either direction. The tubes are charged with a refrigerant liquid which partially fills each of the heat exchangers and the tube connecting the lower ends thereof. During operation, air streams are directed over the two heat exchangers; if the air streams are at different temperatures, the refrigerant liquid will extract heat from the warmer air stream, thereby evaporating the liquid which will pass in the gaseous state through the tube connecting the upper ends of the two heat exchange coils. Since the air stream passing over the other tube is at a lower temperature, the refrigerant will be condensed back to the liquid state and may flow through the lower connecting tube back to the first-mentioned heat exchanger. The cycle of refrigerant evaporation, condensation and flow between the connected heat exchangers is continuous while air streams at different temperatures, above and below the evaporating temperature of the refrigerant at the operating pressure, are directed over the two heat exchangers.

The invention is disclosed in a number of applications, each of which share the attributes outlined in the preceding paragraph. In its most basic form, the invention employs two heat exchangers connected and charged as stated above arranged in two openings through which a room or other enclosed space communicates with the outside atmosphere. Air from inside the room is exhausted through one of the openings, passing over one of the heat exchangers, and outside air is directed into the room through the other opening, passing over the other heat exchanger. Except for the fans used to direct the air streams over the heat exchangers there are no moving mechanical parts in the system, heat transfer occurring due to the natural flow of refrigerant gas and liquid between the two heat exchangers.

In another application, the two heat exchangers are utilized as the evaporator and condenser of an air conditioning system with normally closed solenoid valves arranged in the lines which directly connect the upper and lower ends, the liquid and gas flowing through the lower and upper connecting lines, respectively, passing through an expansion device in a lower by-pass line and a compressor in an upper by-pass line. A further application wherein the invention is employed for cooling purposes places one of the heat exchangers in the outside air and the other completely within the space to be cooled with only the upper and lower connecting tubes passing through the wall between the outside and inside space. In still another embodiment, a building wall module or panel is constructed in layers which includes the two heat exchangers in juxtaposed relation, separated by an insulating layers; heat collected on the exterior panel is given up within the building by free convection on the interior panel face.

In each of the disclosed applications or embodiments, the invention employs two heat exchangers charged with a refrigerant which may circulate freely between the two by gravity and pressure, requiring no pumps, compressors, etc., to achieve the desired heat exchange.

DETAILED DESCRIPTION

The present invention utilizes a circulating refrigerant liquid to effect heat transfer, and therefore operates with the same fundamental principles as all mechanical heat exchange systems. The refrigerant liquid is boiled or evaporated to a gaseous state by obsorbing heat from, and thereby cooling, the surrounding air. The heat is dissipated or given off from the refrigerant to the surrounding air as the gas is condensed back to the initial liquid state. When the refrigerant reaches its evaporation or condensation temperature it will continue to absorb or give up heat while remaining at the same temperature until evaporation or condensation occur. This is due to the fact that the gaseous state is at a higher energy level, the so-called latent heats of vaporization and condensation being absorbed or given up as the transition in energy level occurs.

The most commonly used refrigerant in current use is known as R-22. Approximately 73 BTU is required to evaporate one pound of R-22 at a temperature of 45° F., at which temperature the liquid and gaseous phases are in equilibrium at a pressure of 76 psig. Thus, 76 psig is referred to as the saturation pressure at 45° F. of R-22. Since the liquid and gas phases within a closed container must remain in equilibrium, the pressure will assume the saturation pressure corresponding to the temperature of the liquid. For example, if the unevaporated portion of R-22 in a closed container is warmed to 130° F., the pressure in the container will be 300 psig.

In standard air conditioning systems a condensing unit in the form of a compressor run by a suitable energy source and an outdoor heat transfer coil changes the gaseous refrigerant which is boiled off in the cooling coil back to the liquid state for circulation back to the coil. The standard design conditions for air conditioning systems are 95° F. DB (dry bulb temperature) outside and 80° F. DB, 67° F. WB (wet bulb temperature) inside the space to be cooled. Most cooling coils are designed to operate at 45° F., low enough to remove moisture from the air and still be safely above 32° F. to prevent freezing of the moisture on the coil surface. Most outdoor condensing unit coils are designed to operate at 130° F. in order to reject heat to the outside air. In order to convert the gaseous refrigerant, which has been evaporated at a temperature of 45° F. and 76 psig pressure, back to the liquid state at a temperature of 130° F. it must be pumped or compressed to a pressure of 300 psig.

Figure 1:
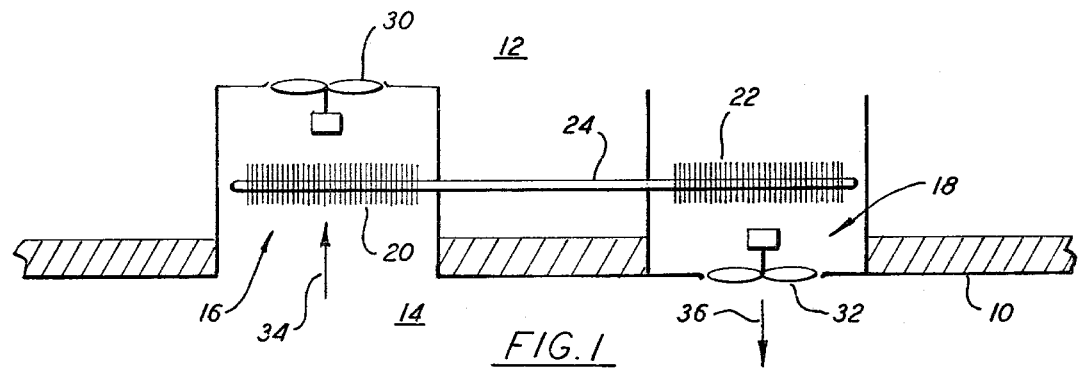
FIG. 1 is a diagrammatic, plan view of a section of building wall separating an enclosed room from outside air, showing the present invention in a first application.

With this background, reference is now made to the accompanying drawings which are diagrammatic throughout since constructional details are subject to many modifications which will be readily apparent to those skilled in the art. In fact, the wide variety of choice in physical design, allowing each installation to be tailored to the requirements of the particular application, is one of the major advantages of the invention. The invention is illustrated in FIG. 1 as utilized in a typical heat recovery system. A section of building wall 10 separates an enclosed room or other space 12, wherein the temperature is to be maintained at a desired level which may be either above or below the outside temperature, from air outside the building, generally indicated by reference numeral 14. Two openings 16 and 18 are provided in wall 10 and, although they are indicated as being rather closely adjacent, the openings may be widely spaced or even placed in different walls.

Figure 2:
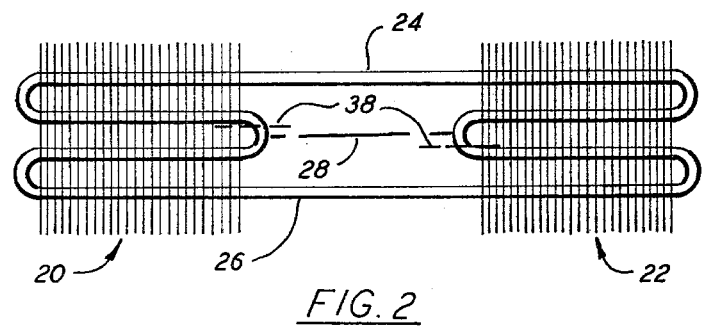
FIG. 2 is a diagrammatic, elevational view of the heat exchanger portion of FIG. 1.

Positioned within or immediately adjacent openings 16 and 18 are fin-tube heat exchangers 20 and 22, respectively, of known design. As shown in FIG. 2, the coils of the two heat exchangers are arranged in a vertical plane with the upper and lower ends of each at substantially the same height. A closed, sealed system is formed by connecting the upper and lower ends of heat exchangers 20 and 22 by tubes 24 and 26, respectively. Prior to sealing the system, a charge of refrigerant liquid is placed therein sufficient to at least flood the lower ends of both heat exchanger coils. As shown, the initial charge level of the refrigerant liquid fills about half of each heat exchanger, being indicated in FIG. 2 by line 28.

In operation, air is exhausted from room 12, for ventilation or any other purpose, through opening 18 and outside air 14 enters through opening 16 at an approximately equal rate. Motor driven fans 30 and 32 are provided to direct air streams over heat exchangers 20 and 22 in the directions indicated by arrows 34 and 36, respectively. If the temperature of the air in room 12 is higher than that of outside air 14, as during wnter operation, the air passing over heat exchanger 22 is warmer than the incoming air passing over heat exchanger 20. Thus, the refrigerant in the coil of exchanger 22 will be warmed and the liquid will begin to evaporate, extracting heat from the air stream being exhausted. The gaseous refrigerant will pass through upper connecting tube 24 to the coil of heat exchanger 20. The colder outside air passing over exchanger 20 will cause condensation of the refrigerant back to the liquid phase, which may return through lower connecting tube 26 to exchanger 22, thereby giving up heat which is absorbed by the incoming air. The cycle of evaporation, condensation and flow of gas and liquid between the heat exchangers is continuous as long as air flow at a temperature differential is maintained.

As the system is illustrated in FIGS. 1 and 2, flow is in the counter-clockwise direction for the operation just described, i.e., when extracting heat from the outgoing air and adding heat to the incoming air. Since the warmer air is passing over exchanger 22, evaporating the liquid therein, the pressure will be slightly higher than in exchanger 20. The liquid level in exchanger 22 will be slightly lower and that in exchanger 20 slightly higher than the initial charge level, as indicated by lines 38. The difference of liquid level causes the flow of liquid from the lower presser exchanger 20 back to exchanger 22.

When fans 30 and 32 are initially energized to begin flow of air over the two heat exchangers the thermal capacity of the system will continue to increase until there is a balance of the pressure drop caused by the flow of refrigerant and the difference in refrigerant levels within the two coils. The particular design, therefore, will vary in accordance with the operating parameters of the specific installation such as design temperature difference, physical space to be used, thermal coefficient of the fin-tube exchangers, etc.

The system will operate in the same manner, but in the reverse direction, if the temperature within the enclosed space is cooler than the outside air, such as when ventilating a space being cooled by air-conditioning apparatus. The evaporation and condensation of the refrigerant provides the means of heat transfer from the exhaust air to the incoming air through the latent heat of vaporization, as in normal operation of a refrigeration system. The system of the present invention, however, does not require a compressor or pump since the flow of refrigerant is caused solely by the temperature differential of the two airstreams.

Figure 3:
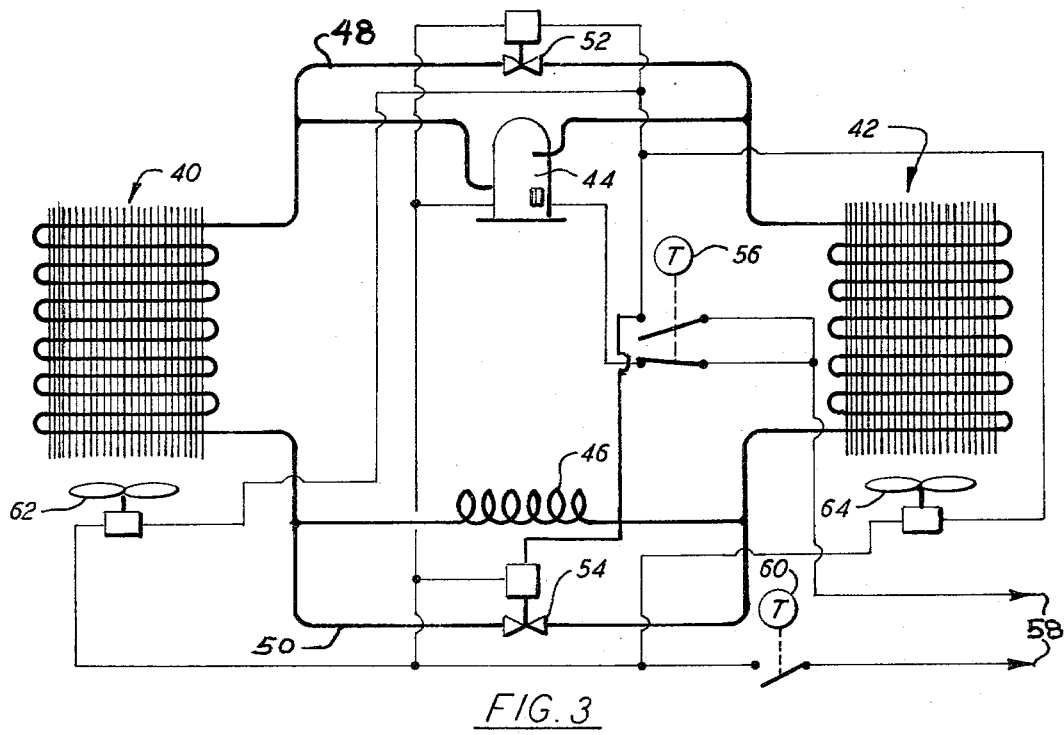
FIGS. 3, 4 and 4a are diagrammatic showings of the invention in alternate configurations for cooling applications.

Turning now to FIG. 3, the present invention is employed in combination with a conventional air conditioning system. It sometimes happens that a central or split-system air conditioning unit is operated to provide mechanical cooling when outside air would be sufficient but is unavailable. A typical example is a spring or fall day when the outside temperature is, for example, 60° F. but inside temperature is much higher because of the sun load and internal heat gains from various sources. It is often undesirable to install the necessary dampers, ducting and controls to use outside air directly for cooling.

Existing central air conditioning systems may be modified according to the present invention to utilize the cooler outside air in the manner indicated in FIG. 3. The two fin-tube heat exchangers, indicated in this embodiment by reference numerals 40 and 42, serve as the condenser and evaporator, respectively, of the air conditioning system. During normal operation, when inside air is being cooled to a temperature below that of the outside air, the refrigerant liquid absorbs heat as it converts to the gaseous state in evaporator 42, the gas then being compressed to a higher pressure in compressor 44 and condensed back to the liquid state in condenser 40. The refrigerant liquid is then delivered back, through expansion device 46 such as a conventional capillary tube, to evaporator 42 to again effect the desired cooling. Typically, condenser 40 and compressor 44 are located outside the house or other space to be cooled.

The present invention is employed in conjunction with the standard system by adding lines 48 and 50 by-passing compressor 44 and expansion device 46, respectively, and arranging the coils of condenser 40 and evaporator 42 so that at least the lower ends of both contain refrigerant liquid when the standard system is not running. Solenoid-operated valves 52 and 54 are provided in lines 48 and 50, respectively, and are closed except when the outside temperatures is below 60° F. and cooling is desired. An outside temperature sensor 56 is connected in the line between power supply 58 and each of valves 52 and 54. The usual, manually controlled, inside temperature sensor 60 is selectively set to the desired inside temperature and will connect power supply 58 to compressor 44 for normal operation of the system. When the outside temperature is below the setpoint of sensor 56, the switches controlled thereby will be in reversed positions from those shown in FIG. 3. Hence, compressor 44 will not operate, since its circuit is then open, and instead valves 52 and 54 are opened to permit flow of refrigerant liquid between heat exchangers 40 and 42. At the same time, fans 62 and 64 are connected across power supply 58 and will direct air streams over the condenser and evaporator to aid in heat exchange.

The warmer air in the inside space causes evaporation of the refrigerant liquid as it passes over the coil of evaporator 42. The refrigerant in the gaseous state passes through line 48 and valve 52 to condenser 40. The cooler (below 60° F.) outside air circulated over condenser 40 by fan 62 causes condensation back to the liquid state, which passes through line 50 and valve 54, back to evaporator 42, and so on. Operation from natural flow due to gravity and pressure differential between evaporator and condenser is the same as previously explained.

This method of cooling an inside space indirectly when the outside air is at a lower temperature may be used in connection with packaged air conditioning units, as well as with the split system described. Although it is normally very easy to bring the cooler outside air directly into the conditioned space in locations where through-the-wall or window air-conditioning units are installed, the presence of outside odors or pollutants may make this undesirable in some instances. The present invention may then be employed to effect indirect natural cooling.

Figure 4:
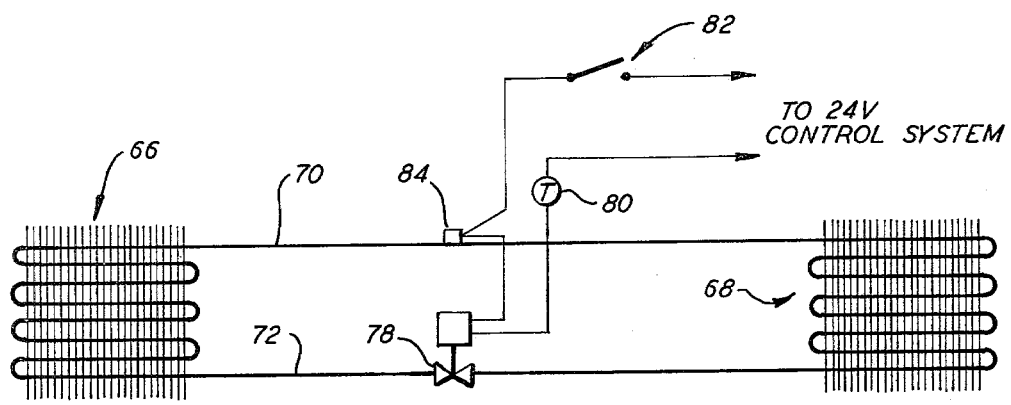
Figure 4A:
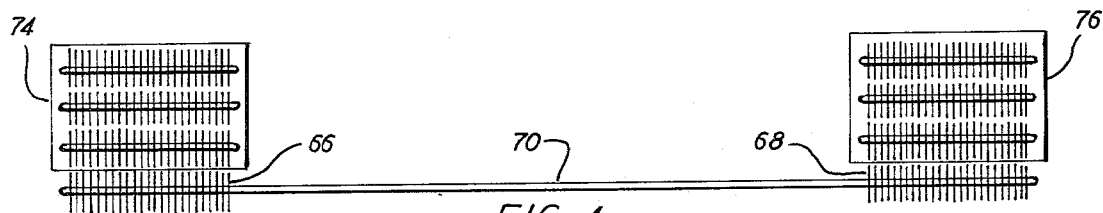

An economical alternative to by-pass lines and solenoid valves of FIG. 3 is a system wherein the two heat exchangers, connected and charged with refrigerant liquid in the manner previously explained, are juxtaposed with but separate from the fin-tube bundles which make up the normal evaporator and condenser coils. Such a system is illustrated in FIGS. 4 and 4a, wherein two fin-tube heat exchangers 66 and 68 are connected at the upper and lower ends by lines 70 and 72 and charged with a refrigerant liquid for operation in the same manner as described in connection with FIGS. 1 and 2. These heat exchangers are arranged as an additional tube row in association with fin-tube bundles 74 and 76 which make up the evaporator and condenser of the standard air-conditioning system. A solenoid or electric expansion valve 78 is provided in line 72 and is connected to thermostat 80 within the conditioned space and an outside sensor represented by switch 82, set to close at an outside temperature of 60° F.

Thus, when the inside thermostat 80 calls for cooling and the outside temperature is at or below 60° F., valve 78 will open and the refrigerant in its gaseous and liquid states will flow through lines 70 and 72, respectively, to cool the inside air and reject heat to the outside in the manner previously explained. During such operation, the standard air-conditioning system is not in operation, with consequent savings in energy consumption. By using an electric expansion valve in line 72, liquid refrigerant may be prevented by providing thermistor 84 in line 70 to sense a drop in temperature indicating the presence of liquid refrigerant. Thermistor 84 is connected in the circuit of valve 78 to cause the valve orifice size to be reduced, thereby increasing the pressure drop across the valve, in response to a temperature indicating presence of liquid refrigerant in line 70.

The system shown in FIGS. 4 and 4a, is not limited to air-conditioning applications, but may also be employed to advantage with refrigeration equipment which is used to cool a cold storage space during winter operation in northern climates. The condenser coil package could be installed on an outside wall, rejecting heat to the colder outside air in winter through operation of the present invention and avoiding adding heat to the inside air in the room (which may also be air conditioned) where the refrigerator is located during summer operation with the standard equipment.

Figure 5:
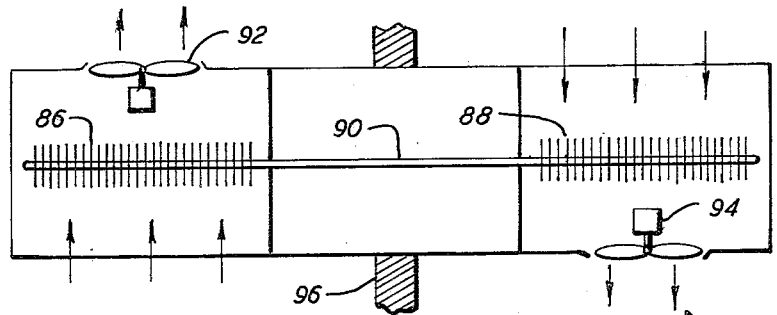
FIG. 5 illustrates an application wherein the invention is utilized to effect cooling of an enclosed space without circulation of air into and out of such space.

A similar application is illustrated in FIG. 5 wherein one of fin-tube coils 86 and 88 is positioned inside, and the other outside, a space which is to be cooled into closer proximity to the outside temperature without direct exposure to outside air. Coils 86 and 88 are connected at their upper and lower ends by tubing 90 and charged with a suitable refrigerant liquid, as in the other described applications. Fans 92 and 94 provide circulation of the air over the respective coils on the side of wall 96 where they are located. Thus, when the outside air, where coil 86 is located, is cooler than the inside air, the refrigerant liquid will flow through the lower connecting line through wall 96 to coil 88 where it is evaporated as it picks up heat from the warmer inside air; the evaporated, gaseous refrigerant flows back to coil 86 through the upper connecting line and rejects heat to the outside air as it condenses back to the liquid state. The inside air is thereby cooled to at or near outside temperature without the use of mechanical refrigeration and without exposure to outside air, as may be desirable for example in enclosures of computers or other electronic devices, electrical switchgear and transformers, environmental test chambers, and the like.

Figure 6:
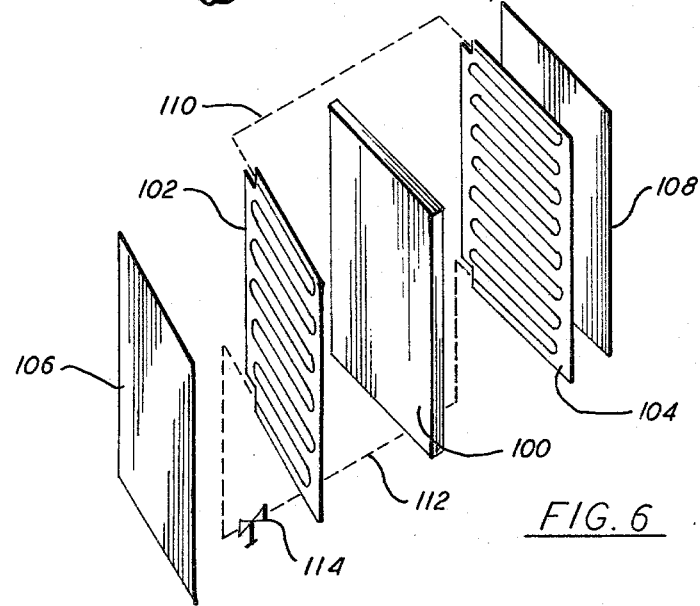
FIG. 6 is an exploded perspective view of a building panel constructed to utilize the heat exchange principles of the invention.

A still further application of the invention is illustrated in FIG. 6 in the form of a thermal-control building panel which directly utilizes solar heat. Although there are many designs for the collection of solar heat for comfort heating purposes, they are not in general use at the present time due to the cost and the large space required in relation to heating capacity. Both of these problems could be alleviated by an economical solar collector incorporated in a panel which forms a portion of the building walls which separate the occupied space from the outside environment.

A building panel constructed to utilize solar heat according to the principles of the present invention is shown in exploded perspective in FIG. 6. In the form shown, the building panel is formed of a plurality of juxtaposed or laminated panels. Central panel 100 is of heat insulating material and separates the two heat exchangers, one of which faces the outside of the building, and the other the occupied space within. The heat exchangers are formed by embossing or otherwise forming a continuous groove or recess in one surface of panels 102 and 104. The recessed surfaces of panels 102 and 104 are placed in contact with planar surfaces of panels 106 and 108, respectively, and sealed around the edges so that the recesses form a continuous, enclosed conduit with access openings at the upper and lower ends. Suitable connecting lines provide communication between the conduits of panels 102 and 104 at the upper and lower ends as indicated diagrammatically by dotted lines 110 and 112, respectively.

The enclosed conduits are partially filled with a refrigerant liquid, as in the case of the previously described coil heat exchangers. In this application it is preferred that a lower pressure refrigerant, such as R-114 or R-11, be used. Control device 114 is placed in lower connecting line 112 so that the circuit may be opened to allow heat collected on the exterior panel by solar energy to be given up within the building by free connection on the interior panel face. Control device 114 may be opened and closed manually, or automatically by bi-metallic devices built into the panel itself, or by other means.

As an alternate to heating by convection from the inner panel, a tube-in-tube heat exchanger may be provided on the inside where heat is given up by the refrigerant as it is condensed back to the liquid state. Water circulated through the inner tube would be heated by the heat of condensation of the refrigerant in the outer tube. The water could be circulated through-out the building for use in various ways, among which could be a water-source heat pump system.

From the foregoing it is apparent that the present invention provides a method and system for heat exchange between inside or room air and outside air which offers advantages not attainable with previously known methods and systems. As previously mentioned, the only currently known heat transfer or heat recovery systems are those employing a plurality of so-called heat pipes, such as the system disclosed in Barkmann U.S. Pat. No. 3,788,388 wherein each pipe comprises an independent circuit requiring individual charging, leak testing, etc., as opposed to the single, continuous circuit of the present invention.

In the foregoing description and the following claims, the terms "room" and "outside" are to be taken in the broad sense of an enclosed space and anything physically separated, as by walls, from such space. In many applications, the enclosed space or room will be a habitable enclosure wherein the temperature is to be maintained within a given range for physical comfort, but in other applications the room may be an enclosure for mechanical or electrical equipment which either generates or absorbs heat. The "outside" may be entirely unenclosed atmospheric air or may be another fully or partly enclosed space which is isolated from the "room" and at a different temperature, at least during periods of heat exchange operation of the invention.

In a first specific aspect of the invention, as illustrated and described in connection with FIGS. 1 and 2, energy losses are reduced in ventilating a room with outside air which may be either warmer or colder than the desired inside temperature. The outside air enters the room through a duct or opening in the wall, passing over one of the two continuous heat exchangers, and leaves through a separate opening, passing over the other heat exchanger. Heat is supplied to the room by conventional heating means when required to raise the temperature to the desired level. During such periods, when outside temperature is below room temperature and outside air is brought in and inside air exhausted for ventilation purposes, heat is given up by the outgoing air and absorbed by the incoming air due to the natural flow of heat and refrigerant in the two continuous heat exchangers. Likewise, when inside air is being cooled by conventional air conditioning apparatus and warmer outside air is brought in to ventilate the room, the outgoing air is heated and the incoming air cooled by the same process. Reversibility is automatic, requiring no valves, temperature sensors, or other equipment. In each instance, the present invention operates to bring the temperature of the incoming air into closer proximity with that of room air, thus making operation of the separate heating and cooling systems more efficient.

In a second aspect, as in the applications shown and described in FIGS. 3–6, the temperature of room air is raised or lowered toward that of outside air without air flow between inside and outside. This is of special importance in situations where room air must be "clean", i.e., free of dust or other pollutants or contaminants which are or may be present in outside air. Elaborate and costly filtering systems are commonly employed to remove particulate matter and/or gases from air which is brought into certain enclosed spaces for heating, cooling or ventilating purposes due to the necessity of maintaining a strictly clean environment. The present invention, in the embodiment of FIGS. 3–6, provides means for raising or lowering the temperature of the enclosed space while protecting it from the possibility of contamination. In this instance, it may be particularly useful to enclose the area outside the room wherein temperature control is to be effected so that the outside area may be heated or cooled, if necessary, to carry heat correspondingly to or from the fully enclosed room.

It is also specifically emphasized that the system of the present invention is well suited to applications wherein it is necessary or desirable that the two continuous heat exchanger coils be spaced by a substantial distance. That is, the entire heat exchange surfaces of both coils are exposed to the temperature differential even though the lines connecting the upper and lower ends of the coils may be many feet in length. In this context, "substantial distance" is meant to imply a distance at least greater, and possibly several times greater, than the width of the heat exchanger coils. This is not possible, of course, with systems employing the aforementioned heat pipes which present a continuous heat exchange surface from end to end, and is not suggested in any other prior art heat exchange system employing natural flow of heat and refrigerant in a continuous circuit.

What is claimed is:

1. A method of reducing energy losses in heating and cooling an enclosed room while ventilating said room with outside air at a temperature below that of said room during heating cycles and above that of said room during cooling cycles by reversible heat exchange between room air and outside air, comprising:
    (a) providing a pair of continuous heat exchange coils each having an upper and a lower end and a plurality of substantially horizontal portions therebetween;
    (b) placing the upper ends of said coils at a vertical level substantially higher than the lower ends of each coil;
    (c) connecting said upper ends for direct communication therebetween and connecting said lower ends for direct communication therebetween;
    (d) charging said coils with a heat exchange liquid to a level substantially above the lower ends and below the upper ends of both of said coils; and
    (e) contacting one of said coils with room air and the other with outside air, whereby refrigerant is evaporated from said one coil when room air is warmer than outside air, and vice versa, thereby increasing the pressure in the coil from which refrigerant is evaporated and causing refrigerant to flow to the other coil giving up heat to the air at the lowest temperature.

2. The method according to claim 1 and including the further steps of:
    (a) forming first and second openings in a wall of said room through which air may flow between the inside and outside of said room;
    (b) positioning one of said coils in said first opening and the other of said coils in said second opening; and
    (c) forcing circulation of air into said room from the outside through one of said openings and out of said room through the other of said openings.

3. The method according to claim 2 wherein said openings are spaced by a substantial distance.

4. The method according to claim 1 and including the further steps of connecting said upper ends for direct communication through either of two separate, upper lines and placing a refrigerant compressor in one of said upper lines, and connecting said lower ends for communication through either of two separate, lower lines and placing a refrigerant expansion device in one of said lower lines.

5. The method according to claim 4 and including the further step of placing valve means in the other of both said upper and lower lines, and providing means for simultaneously opening and closing said valves.

6. A reversible heat exchange system for reducing energy losses in heating or cooling an enclosed room while ventilating said room with outside air at a temperature below that of said room during heating cycles and above that of said room during cooling cycles, said system comprising:
    (a) wall means separating the interior and exterior of said room;
    (b) first and second openings in said wall means through both of which air may flow between the interior and exterior of said room;
    (c) first and second heat exchangers respectively arranged in said first and second openings and each including a continuous coil having upper and lower ends and a plurality of substantially horizontal portions therebetween;
    (d) first and second lines connecting said upper and lower ends, respectively, of said first and second heat exchanger coils for direct communication therebetween;
    (e) a heat exchange liquid with which said coils are charged to a level substantially above said lower ends and below said upper ends thereof; and
    (f) means for causing air to flow through said first opening from the exterior to the interior of said room, passing over said first heat exchange coil, and through said second opening from the interior to the exterior of said room, passing over said second heat exchange coil.

7. The invention according to claim 6 wherein said means for causing air to flow comprises a pair of fans respectively arranged to direct air through said first and second openings.

8. The invention according to claims 6 or 7 wherein said heat exchangers are of the fin-tube type.

9. The invention according to claim 6 wherein said openings are spaced by a substantial distance.

* * * * *